(No Model.)
A. BOSCH.
PRUNING IMPLEMENT.
No. 419,311. Patented Jan. 14, 1890.
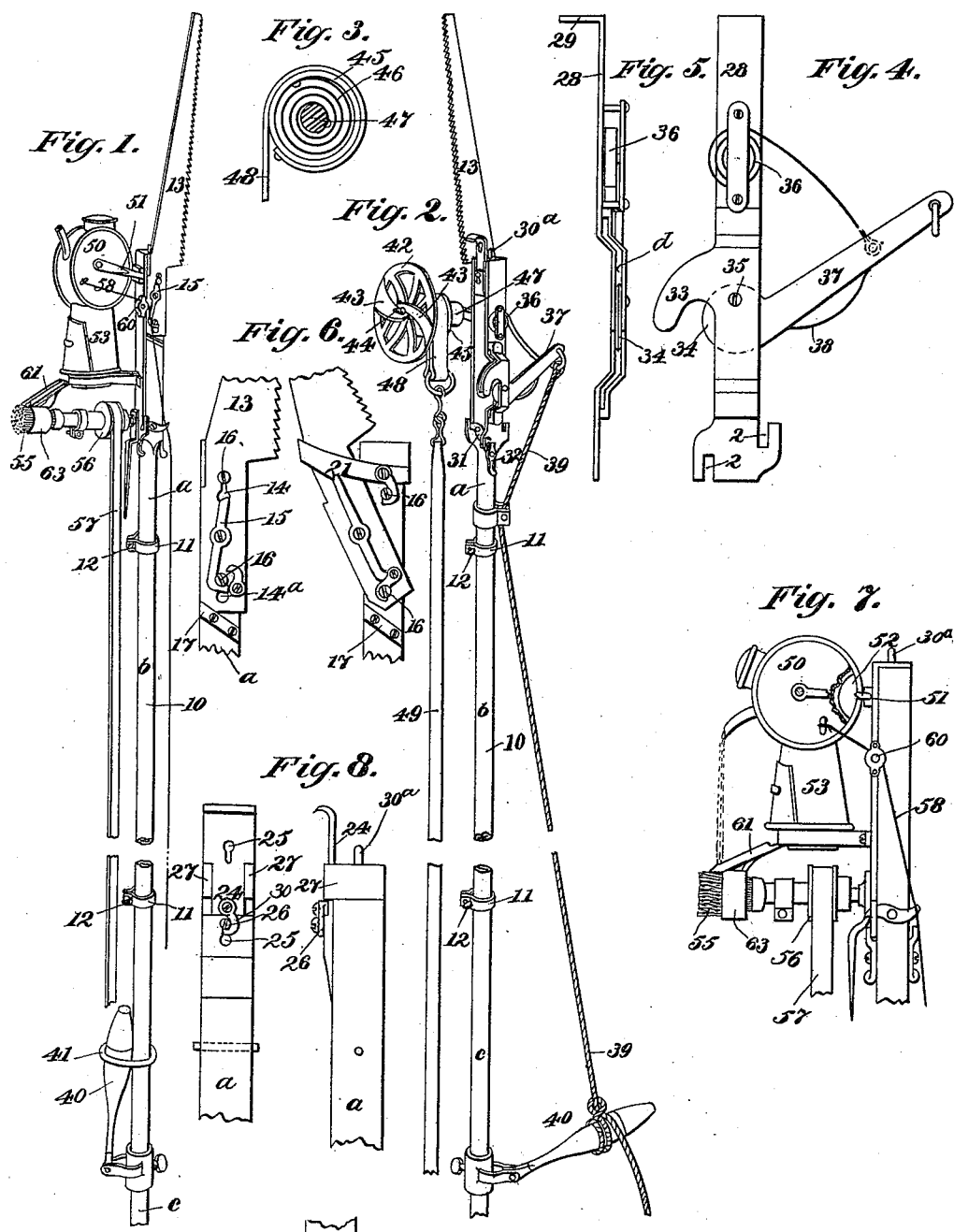

UNITED STATES PATENT OFFICE.

ANDREAS BOSCH, OF PRAIRIE DU CHIEN, WISCONSIN.

PRUNING IMPLEMENT.

SPECIFICATION forming part of Letters Patent No. 419,311, dated January 14, 1890.

Application filed May 8, 1889. Serial No. 310,005. (No model.)

*To all whom it may concern:*

Be it known that I, ANDREAS BOSCH, of Prairie du Chien, in the county of Crawford and State of Wisconsin, have invented a new and Improved Combination Pruning Implement, of which the following is a full, clear, and exact description.

This invention relates to pruning implements of the class illustrated, described, and claimed in Letters Patent of the United States, No. 379,359, granted to me on the 13th day of March, A. D. 1888, the object of the present invention being to improve the construction of the implement forming the subject-matter of the patent above referred to, all as will be hereinafter fully explained, and specifically pointed out in the claims.

Reference is to be had to the accompanying drawings, forming a part of this specification, in which similar figures and letters of reference indicate corresponding parts in all the views.

Figure 1 is a side view of my improved pruning implement, the saw arranged in connection therewith being represented as it appears when mounted to saw downward from the upper side of a limb, and the waxing attachment being represented as it appears when in position upon the pole. Fig. 2 is a view of the opposite side of the pole, the shearing and planing attachments being represented as they appear when in position. Fig. 3 is a detail view illustrating the construction of the planer-drum. Fig. 4 is an enlarged side view of the shearing attachment. Fig. 5 is an edge view of such attachment. Fig. 6 represents the saw-connections. Fig. 7 is an enlarged view of the waxing attachment. Fig. 8 represents the chisel and scraper attachment, and Fig. 9 is a detail view illustrating the construction of the pole-lengthening attachment.

In the drawings, 10 represents a pole or shaft made up of an upper section $a$, a central tube $b$, and a lower section $c$, the tube being formed with split ends, as shown in Fig. 9, such ends being arranged to receive the sections $a$ and $c$, the parts being held together by binding or clamping bands 11, that are held to place by set-screws 12. The pole-sections $a$ and $c$ are formed with ends adapted to fit within the split ends of the tube $b$, and, by preference, are formed with shoulders which abut against the tube ends, as represented in Fig. 9. In connection with the pole I employ a saw 13, having teeth which are arranged to cut upon the downstroke, and this saw I form with two key-hole slots 14 and 14$^a$ and with a catch 15, the key-hole slots being arranged to engage headed studs 16, that are carried by the pole, while the catch 15 is arranged to engage the lower stud, and thus prevent any accidental displacement of the saw after it has been adjusted to the position in which it is shown in Figs. 1 and 6, additional security and support for the saw being secured through the medium of a diagonal brace 17, that is secured to the pole-section $a$.

The position just described is that in which the saw is placed when the limbs are to be cut from the top downward; but in order that large limbs may be cut from the under side upward, so that the limb in falling will not split off a heavy strip and injury the body of the tree, I provide for the setting of the saw as it is shown upon the right in Fig. 6. In this position the saw is supported by a hook 21, which engages the saw-back and is secured to the pole or staff, as represented.

When it is desired to clear away the loose bark or insect-nests from the tree, I remove the saw attachment and secure to the end of the pole a combined chisel and scraper 24, such implement being formed with key-hole slots 25, adapted to engage with a stud 26, which extends from the pole-section $a$ from the side opposite that from which the studs 16 extend. This combined chisel and scraper carries a hook 30, so arranged that when the chisel is up or in position for use it will engage the stud 26 and hold the parts in operative position.

When it is desired to scrape the tree, the combined chisel and scraper is adjusted to the position in which it is shown upon the right in Fig. 8, the implement at this time being guided by laterally-extending flanges 27, which are secured to the upper end of the pole.

In order that small limbs may be trimmed away from the tree, I provide a shearing attachment such as that represented in Figs. 2, 4, and 5, such attachment consisting, essentially, of a frame 28, having an upper flange 29, that is apertured to engage a stud or pin 30ᵃ, which extends upward from the end of the pole-section a, the lower end of the frame 28 being slightly widened and formed with slots 2, which are arranged to be engaged by latches 31, additional security being obtained through the medium of a latch 32, that is pivotally connected with the pole and arranged to overlap the lower end of the frame. The frame 28 is provided with an extending spur 33 and with a blade 34, that is pivotally mounted at 35 between the parallel sections d of the frame, the blade being normally held slightly above the position in which it is shown in Fig. 4 by a coil-spring 36, that is connected to the frame and to an arm 37, the initial upward throw of the arm being secured through the medium of a spring 38, which acts to throw the blade from engagement with a limb after such limb has been cut. In order that the arm 37 may be drawn downward when desired, I secure thereto a cord 39, which extends downward to a lever-handle 40, that is pivotally connected to the handle-section c. When the handle 40 is not in use, it may be upheld by a rubber band or other proper appliance—such as that shown at 41 in Fig. 1—or it may be altogether removed from the pole.

In order that the stumps of the limbs that are severed through the medium of the saw may be planed off, I provide a disk 42, which carries blades 43 and a central gimlet-point 44. This disk is mounted on a drum 45, within which there is coiled a spring 46, one end of the spring being connected to a stud 47, while the other end of the spring is connected to the inner peripheral face of the drum. Upon the drum 45 there is wound a strap 48, and to this strap 48 there is connected a strap or cord 49. To operate this attachment the cord or strap 49 is drawn down and the drum 45 is turned against the tension of its spring, so that when the power applied to the cord is relaxed the spring 46 will act to return the disk to its original position, the strap 48 being at this time rewound upon the drum.

In order that the wounds caused by trimming may be smeared with wax, I provide a can 50, which is pivotally supported by a bracket 51, such can normally resting in the position in which it is shown in Fig. 1, being held in this position through the medium of a weight 52. In order that the contents of the can may be heated, I mount a lamp 53 beneath the can. Beneath the lamp I mount a brush 55, which is connected to a spring-actuated drum 56, that is similar to the drum 45. To the drum 56 I connect a strap or band 57, so that when desired a rotary reciprocating motion may be imparted to the brush 55. In order that the can 50 may be tilted, I connect a cord 58 thereto, said cord leading downward within reach of the operator and being secured near the outer edge of the can, so that by drawing down upon the cord, which passes over a sheave 60, the can may be tilted to the position shown in Fig. 7, and when in this position it will deliver a portion of its contents to a trough 61, which leads to the brush 55, said brush being supported by a band 63, that is held by the trough. It will of course be understood that the band 63 could be of any desired width.

With the implement above described I am able to prune trees irrespective of their height and dress the wounds caused by pruning or trimming them, so that all danger of bleeding is avoided.

Having thus described my invention, I claim as new and desire to secure by Letters Patent—

1. The combination, with a saw, of a sectional pole to which the saw is connected, a short metallic tube formed with split ends adapted to receive the ends of the pole-sections, bands around each end of the tube, and set-screws for fastening the bands, whereby the pole may be lengthened, as and for the purpose hereinbefore set forth.

2. In a pruning implement, the combination, with a pole provided with buttons, of a saw-blade having its shank provided with key-hole slots and a catch for engaging one of the buttons, and a frame with a projecting iron hook to vary the angle of the saw on the frame, with a brace to fasten the same, substantially as herein shown and described.

3. In a pruning implement, the combination, with a pole, of a disk provided with cutting-blades and with a gimlet-point, said disk being pivoted to one side of the pole, and a means for operating said disk, substantially as described.

ANDREAS BOSCH.

Witnesses:
C. S. FULLER,
T. B. WOIN.